United States Patent
Narkar et al.

(10) Patent No.: US 12,353,877 B1
(45) Date of Patent: *Jul. 8, 2025

(54) AUTOMATED ASYMPTOTIC ANALYSIS

(71) Applicant: Styra, Inc., Redwood City, CA (US)

(72) Inventors: Ashutosh Narkar, San Bruno, CA (US); Timothy L. Hinrichs, Los Altos, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,301

(22) Filed: Dec. 5, 2022

Related U.S. Application Data

(63) Continuation of application No. 17/239,288, filed on Apr. 23, 2021, now Pat. No. 11,520,579.

(60) Provisional application No. 63/119,560, filed on Nov. 30, 2020.

(51) Int. Cl.
*G06F 8/77* (2018.01)
*G06F 8/41* (2018.01)
*G06F 8/75* (2018.01)

(52) U.S. Cl.
CPC .......... *G06F 8/77* (2013.01); *G06F 8/443* (2013.01); *G06F 8/75* (2013.01)

(58) Field of Classification Search
CPC ... G06F 8/71; G06F 8/38; G06F 8/427; G06F 8/73; G06F 8/443; G06F 8/75; G06F 8/77
See application file for complete search history.

(56) References Cited

U.S. PATENT DOCUMENTS

| | | | |
|---|---|---|---|
| 5,974,549 A | 10/1999 | Golan | |
| 6,023,583 A | 2/2000 | Honda | |
| 6,985,953 B1 | 1/2006 | Sandhu et al. | |
| 7,043,659 B1 * | 5/2006 | Klein | H04L 41/0893 714/26 |
| 7,124,192 B2 | 10/2006 | High, Jr. et al. | |
| 7,752,661 B2 | 7/2010 | Hemsath et al. | |

(Continued)

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

(Continued)

*Primary Examiner* — Wei Y Zhen
*Assistant Examiner* — Amir Soltanzadeh
(74) *Attorney, Agent, or Firm* — ADELI LLP

(57) ABSTRACT

Some embodiments provide a method for identifying runtime complexity of a policy. The method receives, through a user interface (UI), a set of code defining a particular policy. For each variable in the particular policy, the method identifies a first occurrence of the variable in the particular policy to determine a number of values assigned to the variable. Variables determined to be assigned one value are separated from variables determined to be assigned more than one value. Based on the determinations for each variable, the method calculates a set of metrics that include at least time complexity, size complexity, and count complexity for the particular policy. The method then displays, through the UI, the calculated set of metrics along with a set of one or more suggestions for optimizing the particular policy based on the calculated set of metrics.

23 Claims, 5 Drawing Sheets

(56) References Cited

U.S. PATENT DOCUMENTS

| | | |
|---|---|---|
| 8,266,694 B1 | 9/2012 | Roy |
| 8,613,070 B1 | 12/2013 | Borzycki et al. |
| 8,683,560 B1 | 3/2014 | Brooker et al. |
| 8,782,744 B1 | 7/2014 | Fuller et al. |
| 8,789,138 B2 | 7/2014 | Reierson et al. |
| 9,098,292 B1* | 8/2015 | Zhang ................ G06F 8/35 |
| 9,397,990 B1 | 7/2016 | Taly et al. |
| 9,530,020 B2 | 12/2016 | Brandwine et al. |
| 9,578,004 B2 | 2/2017 | Greenspan et al. |
| 9,648,040 B1 | 5/2017 | Morkel et al. |
| 10,122,757 B1 | 11/2018 | Kruse et al. |
| 10,127,393 B2 | 11/2018 | Ferraiolo et al. |
| 10,257,184 B1 | 4/2019 | Mehta et al. |
| 10,353,726 B2 | 7/2019 | Duan |
| 10,454,975 B1 | 10/2019 | Mehr |
| 10,469,314 B2 | 11/2019 | Ennis, Jr. et al. |
| 10,592,302 B1 | 3/2020 | Hinrichs et al. |
| 10,592,683 B1* | 3/2020 | Lim ................ H04L 63/20 |
| 10,715,514 B1 | 7/2020 | Threlkeld |
| 10,719,373 B1 | 7/2020 | Koponen et al. |
| 10,789,220 B2 | 9/2020 | Mayer et al. |
| 10,984,133 B1 | 4/2021 | Hinrichs et al. |
| 10,986,131 B1* | 4/2021 | Kruse ................ H04L 63/10 |
| 10,990,702 B1 | 4/2021 | Hinrichs et al. |
| 11,023,292 B1 | 6/2021 | Hinrichs et al. |
| 11,080,410 B1 | 8/2021 | Sandall et al. |
| 11,108,827 B2 | 8/2021 | Beckman et al. |
| 11,108,828 B1 | 8/2021 | Curtis et al. |
| 11,170,099 B1* | 11/2021 | Sandall ................ G06F 9/547 |
| 11,245,728 B1 | 2/2022 | Curtis et al. |
| 11,258,824 B1 | 2/2022 | Hinrichs et al. |
| 11,327,815 B1 | 5/2022 | Koponen et al. |
| 11,425,126 B1 | 8/2022 | Horal et al. |
| 11,470,121 B1 | 10/2022 | Curtis et al. |
| 11,477,238 B1 | 10/2022 | Curtis et al. |
| 11,477,239 B1 | 10/2022 | Curtis et al. |
| 11,494,518 B1 | 11/2022 | Curtis et al. |
| 11,496,517 B1 | 11/2022 | Hinrichs et al. |
| 11,502,992 B1 | 11/2022 | Koponen et al. |
| 11,509,658 B1 | 11/2022 | Kulkarni |
| 11,513,778 B1 | 11/2022 | Graves et al. |
| 11,520,579 B1 | 12/2022 | Narkar et al. |
| 11,847,241 B1 | 12/2023 | Cahill et al. |
| 2005/0114674 A1 | 5/2005 | Carley |
| 2007/0156670 A1 | 7/2007 | Lim |
| 2008/0127152 A1 | 5/2008 | Bera |
| 2009/0063665 A1 | 3/2009 | Bagepalli et al. |
| 2009/0077618 A1 | 3/2009 | Pearce et al. |
| 2010/0281462 A1* | 11/2010 | Festa ................ G06F 8/34 717/118 |
| 2010/0333079 A1 | 12/2010 | Sverdlov et al. |
| 2011/0113484 A1 | 5/2011 | Zeuthen |
| 2012/0030354 A1 | 2/2012 | Razzaq et al. |
| 2012/0066756 A1 | 3/2012 | Vysogorets et al. |
| 2012/0117608 A1* | 5/2012 | Metke ................ H04L 63/0823 726/1 |
| 2012/0144295 A1* | 6/2012 | Clark ................ G06F 9/44505 715/255 |
| 2012/0221810 A1 | 8/2012 | Shah et al. |
| 2012/0311672 A1 | 12/2012 | Connor et al. |
| 2012/0331539 A1 | 12/2012 | Matsugashita |
| 2013/0226970 A1 | 8/2013 | Weber et al. |
| 2014/0032691 A1 | 1/2014 | Barton et al. |
| 2014/0032759 A1 | 1/2014 | Barton et al. |
| 2014/0033267 A1 | 1/2014 | Aciicmez |
| 2014/0237594 A1 | 8/2014 | Thakadu et al. |
| 2015/0089575 A1 | 3/2015 | Vepa et al. |
| 2015/0213449 A1 | 7/2015 | Morrison et al. |
| 2015/0295808 A1 | 10/2015 | O'Malley et al. |
| 2016/0034900 A1 | 2/2016 | Nelsen et al. |
| 2016/0057107 A1 | 2/2016 | Call et al. |
| 2017/0024428 A1 | 1/2017 | Patiejunas et al. |
| 2017/0161120 A1 | 6/2017 | Sasaki et al. |
| 2017/0220370 A1 | 8/2017 | Klompje et al. |
| 2017/0237729 A1 | 8/2017 | Uppalapati |
| 2017/0302655 A1 | 10/2017 | Sondhi et al. |
| 2017/0346807 A1 | 11/2017 | Blasi |
| 2017/0364702 A1* | 12/2017 | Goldfarb ............ G06F 21/6218 |
| 2018/0067790 A1 | 3/2018 | Chheda et al. |
| 2018/0082053 A1 | 3/2018 | Brown et al. |
| 2018/0109538 A1 | 4/2018 | Kumar et al. |
| 2018/0309746 A1 | 10/2018 | Blasi |
| 2019/0007418 A1 | 1/2019 | Cook et al. |
| 2019/0007443 A1 | 1/2019 | Cook et al. |
| 2019/0190959 A1* | 6/2019 | Yuan ................ G06F 21/604 |
| 2019/0230130 A1 | 7/2019 | Beckman et al. |
| 2019/0236975 A1* | 8/2019 | Chong ................ G06F 8/34 |
| 2019/0245862 A1 | 8/2019 | Kruse et al. |
| 2019/0386973 A1 | 12/2019 | Patwardhan et al. |
| 2020/0007580 A1 | 1/2020 | Liderman et al. |
| 2020/0234346 A1* | 7/2020 | Venkateswaran ......... G06F 8/77 |
| 2020/0241921 A1 | 7/2020 | Calmon et al. |
| 2021/0029029 A1 | 1/2021 | Mehmedagic et al. |
| 2021/0240550 A1 | 8/2021 | Hinrichs et al. |
| 2021/0248017 A1 | 8/2021 | Hinrichs et al. |
| 2021/0365571 A1 | 11/2021 | Sandall et al. |
| 2022/0269549 A1 | 8/2022 | Koponen et al. |

OTHER PUBLICATIONS

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Non-Published commonly Owned U.S. Appl. No. 16/050,119, filed Jul. 31, 2018, 55 pages, Styra, Inc.

Non-Published commonly Owned U.S. Appl. No. 16/050,143, filed Jul. 31, 2018, 56 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, 6 pages, IEEE, London, UK.

* cited by examiner

315

Run-time Complexity: *O(input.request.object.spec.containers)*

310

```
package play deny {
  input.request.kind.kind == "Pod"
  some i
  image := input.request.object.spec.containers[i].image
  not startswith(image, "hooli.com/")
}
```

Run-time Complexity: *O(input.request.object.spec.containers) * O(foo)*

320

```
package play deny {
  input.request.kind.kind == "Pod"
  some i
  image := input.request.object.spec.containers[i].image
  foo(image)
} foo(x) {
  data.bar[_] == x
}
```

*Figure 3B*

AUTOMATED ASYMPTOTIC ANALYSIS

CLAIM OF BENEFIT TO PRIOR APPLICATIONS

This application is a continuation application of U.S. patent application Ser. No. 17/239,288, filed Apr. 23, 2021, now isued as U.S. Pat. No. 11,520,579. U.S. patent application Ser. No. 17/239,288 claims the benefit of U.S. Provisional Patent Application 63/119,560, filed Nov. 30, 2020. U.S. patent application Ser. No. 17/239,288, now issued as U.S. Pat. No. 11,520,579, is incorporated herein by reference.

BACKGROUND

Typical applications for defining code-based policies do not provide tools for identifying runtime complexity of these policies or for optimizing these policies based on runtime complexity metrics so that they run faster and more efficiently. Thus, policy writers can encounter a number of speed- and performance-related issues without being able to identify the cause of these issues, and therefore are also unable to properly remedy the code to improve the policy. In some cases, even code that appears simple can have a high complexity that causes the policy to run slowly. While some speed-and performance-related issues may be the result of other factors, many times, these issues can arise because of the way that the code is authored and can be identified by first identifying the runtime of the code.

BRIEF SUMMARY

Some embodiments of the invention provide a runtime complexity tool for identifying the runtime complexity of a policy in order to optimize the policy. Through a user interface (UI), the runtime complexity tool receives a set of code for a particular policy. For each variable in the particular policy, the runtime complexity tool identifies a first occurrence of the variable in the particular policy to determine the number of values assigned to the variable based on any available input. Based on the determinations for each variable, the runtime complexity tool calculates a set of metrics that include at least time complexity, size complexity, and count complexity for the particular policy. The runtime complexity tool then displays, through the UI, the calculated set of metrics along with a set of one or more suggestions for optimizing the particular policy based on the calculated set of metrics.

In some embodiments, runtime complexity tool bins variables that are determined to be assigned one possible value (i.e., variables that do not iterate) in a first storage structure ("OneValue"), and bins variables that are determined to be assigned more than one value (i.e., variables that iterate) in a second storage structure ("ManyValues"). For iterative variables, some embodiments also identify the number of iterations for the variable (i.e., the number of possible values assigned to the variable) as well as the resulting values. In some embodiments, one or more variables can appear in two or more expressions within the particular policy. In some such embodiments, only the first occurrence of the variable is processed. In order to calculate the set of metrics for the particular policy, some embodiments use the data from the first and second data structures.

Time complexity, according to some embodiments, is an expression over input representing a maximum (i.e. worst case scenario) number of elements from the input that are evaluated. In other words, time complexity is based on the number of elements evaluated. Size complexity is an expression over input representing a slice of data that a variable evaluates to, according to some embodiments. Lastly, in some embodiments, count complexity is the number of values assigned to a variable within an array, set, or object. Each of these complexity metrics, in some embodiments, are reported (e.g., through the UI) as separate metrics.

In some embodiments, the runtime complexity tool performs these operations as a user drafts the set of code for the policy. In other embodiments, the runtime complexity tool only performs these operations once the full set of code for the policy has been defined. Additionally, in some embodiments, the runtime complexity tool reports the computed metrics without providing any suggestions regarding how to optimize the policy. Once the metrics and/or suggestions are provided through the UI, it is up to the user to determine whether to implement any of the suggestions, or optimize the policy in any way based on the reported metrics.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

FIGS. 3A-3B illustrate a first use case of the runtime complexity, according to some embodiments.

DETAILED DESCRIPTION

Figure 1A:
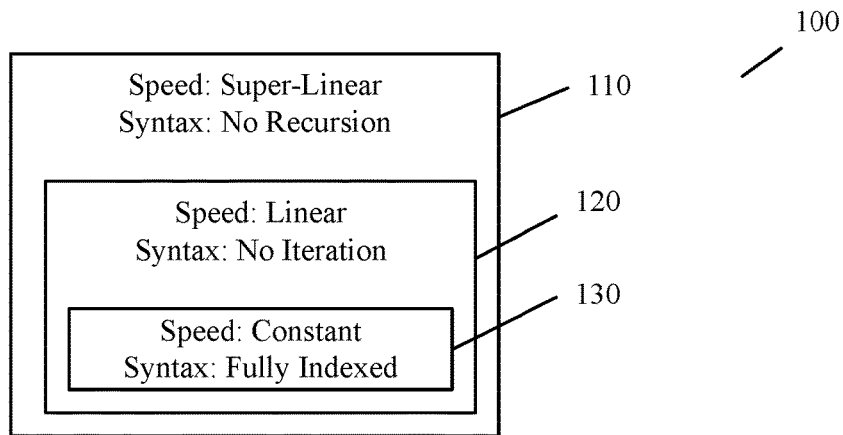
FIGS. 1A-1B conceptually illustrate different layers of the Rego language and a corresponding graph of the complexities of each layer, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a runtime complexity tool for identifying the runtime complexity of a policy in order to optimize the policy. Through a user interface (UI), the runtime complexity tool receives a set of code defining a particular policy. For each variable in the particular policy, the runtime complexity tool identifies a first occurrence of the variable in the particular policy to determine the number of values assigned to the variable based on any available input data. Based on the determinations for each variable, the runtime complexity tool calculates a set of metrics that include at least time complexity, size complexity, and count complexity for the particular policy. The runtime complexity tool then displays, through the UI, the calculated set of metrics along with a set of one or more suggestions for optimizing the particular policy based on the calculated set of metrics.

In some embodiments, runtime complexity tool bins variables that are determined to be assigned one possible value (i.e., variables that do not iterate) in a first storage structure ("OneValue"), and bins variables that are determined to be assigned more than one value (i.e., variables that iterate) in a second storage structure ("Many Values"). For iterative variables, some embodiments also identify the number of iterations for the variable (i.e., the number of possible values assigned to the variable) as well as the resulting values. In some embodiments, one or more variables can appear in two or more expressions within the particular policy. In some such embodiments, only the first occurrence of the variable is processed. In order to calculate the set of metrics for the particular policy, some embodiments use the data from the first and second data structures.

Time complexity, according to some embodiments, is an expression over input representing a maximum (i.e. worst case scenario) number of elements from the input that are evaluated. In other words, time complexity is based on the number of elements evaluated. Size complexity is an expression over input representing a slice of data that a variable evaluates to, according to some embodiments. Lastly, in some embodiments, count complexity is the number of values assigned to a variable within an array, set, or object. Each of these complexity metrics, in some embodiments, are reported as separate metrics through the UI for review by a user.

In some embodiments, the runtime complexity tool performs these operations as a user drafts the set of code for the policy. In other embodiments, the runtime complexity tool only performs these operations once the full set of code for the policy has been defined. Additionally, in some embodiments, the runtime complexity tool reports the computed metrics without providing any suggestions regarding how to optimize the policy. Once the metrics and/or suggestions are provided through the UI, it is up to the user to determine whether to implement any of the suggestions, or optimize the policy in any way based on the reported metrics.

Figure 1B:
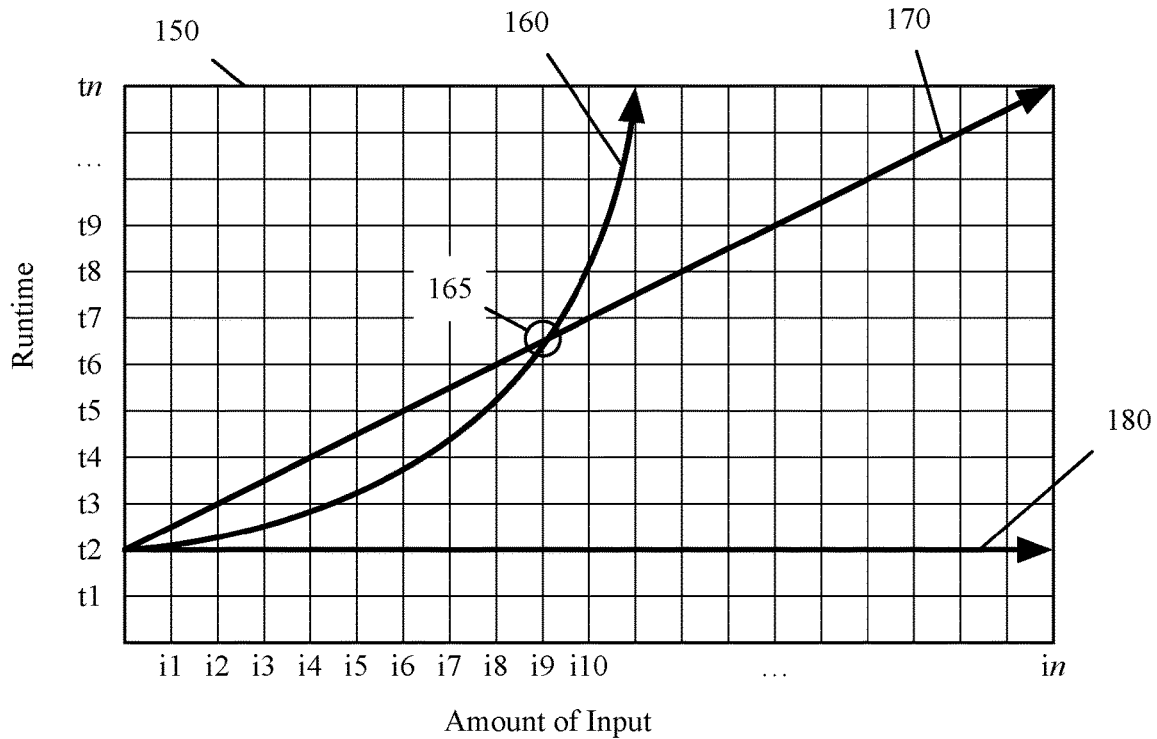

Programming languages such as Rego are designed with multiple layers such that the core is syntactically simple, the middle layer is more expressive at the cost of performance, while the outermost layer is very expressive, but fails to be Turing complete (i.e., is not computationally universal). FIG. 1A conceptually illustrates some of these Rego layers 100, while FIG. 1B illustrates an example graph 150 of the complexities of the layers. FIGS. 1A-1B will be described together below.

As shown, the outermost layer 110 is identified as having super-linear (e.g., quadratic) speed, and does not support recursion in syntax. In other words, while this is the most expressive layer, it is also the slowest, lacks universal computability, and has a complexity that is super-linear (i.e., $O(n^2)$), and is therefore the least desirable of any of the layers. In the graph 150, the complexity of the outermost layer 110 is illustrated by the curved line 160. As shown, while the line 160 starts below the line 170, it quickly surpasses 170 at point 165, and exhibits exponential growth as the amount of input grows.

Alternatively, the middle layer 120 is identified as having linear speed, and does not have iteration, meaning there is no repetition to obtain the output. Layer 120 has a complexity that is linear (i.e., $O(n)$), which is an improvement from super-linear, but still not the most desirable outcome. The expressive nature of layer 120 comes at the cost of some performance in some embodiments, as mentioned above. Complexity for layer 120 is represented by the diagonal line 170 in the graph 150. As shown, while line 170 is an improvement over line 160, the amount of time it takes to run a policy with linear complexity still increases with the amount of input.

Lastly, the core layer 130 is identified as having constant speed and fully indexed syntax. In other words, this is the most desirable layer due to its simplicity (e.g., A=B). As the speed is constant, so is the complexity (i.e., $O(1)$). A straight line 180 represents the complexity for the core layer in the graph 150. When the complexity for a policy is constant, the amount of time it takes to run the policy remains the same regardless of the amount of input used. In some embodiments, if a user writes a set of code defining a policy, and the policy is determined to have super-linear complexity or linear complexity, suggestions for simplifying to code to improve speed may be desired. The runtime complexity tool described herein provides such suggestions, according to some embodiments.

Figure 2:
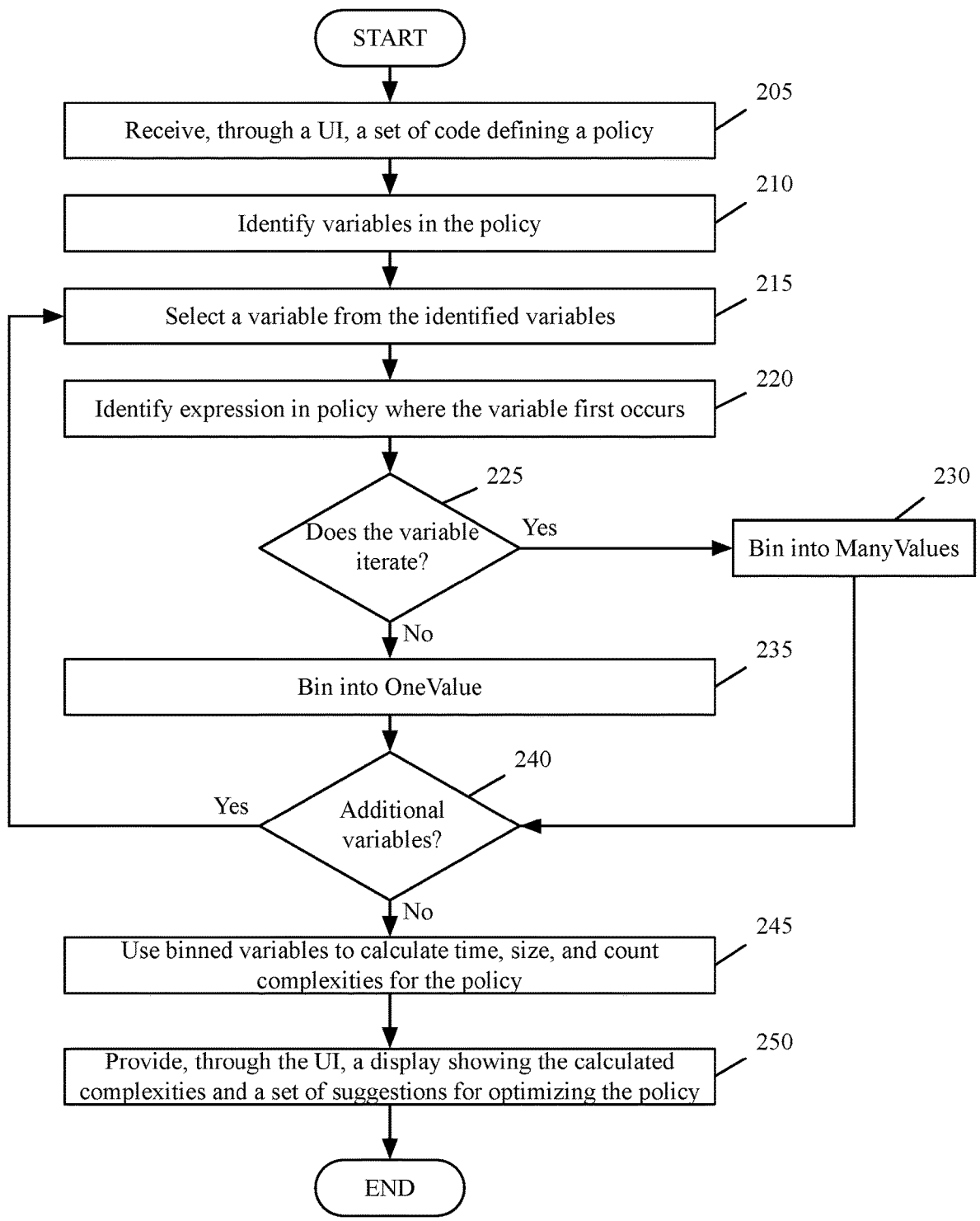
FIG. 2 conceptually illustrates a process performed by the runtime complexity tool to identify complexity of a policy, according to some embodiments.

FIG. 2 illustrates a process 200 performed by the runtime complexity tool, according to some embodiments. The process 200 starts (at 205) by receiving a set of code defining a policy through a UI. While the process 200 is described for a completed policy, in some embodiments, the process 200 may also be triggered to run on a policy as the policy is being written (i.e., as the code defining the policy is being written).

After receiving the policy (at 205), the runtime complexity tool then identifies (at 210) all of the variables in the policy. The runtime complexity tool then selects (at 215) a variable from the identified variables and identifies (at 220) the first expression in the policy in which the variable occurs. In some embodiments, steps 210 through 220 are performed concurrently such that the runtime complexity tool identifies and selects each variable in the policy as it comes across the variable in the policy (i.e., comes across the first expression in which each variable occurs).

Next, the runtime complexity tool determines (at 225) whether the selected variable iterates. In other words, the runtime complexity tool determines whether the variable is assigned one possible value, or more than one possible values based on the expression in which the variable first occurs and any available input. A variable is determined to iterate exactly when the first occurrence of the variable in the rule appears in an expression that may assign more than one value to that variable. Thus, to determine whether a variable iterates, some embodiments include a function CheckIfRuleIterates(rule). The runtime complexity tool runs through the rule body and recursively walks over each expression in the rule body to perform this check, according to some embodiments.

For each expression, the runtime complexity tool maintains a set of data structures including OneValue, Many Values, Seen, Error, and Missing. The Seen data structure in some embodiments is for variables that have already been seen and processed by the algorithm. The OneValue data structure is for variables that have been assigned one value (e.g., x:=1; p[x]; y=x), according to some embodiments. Alternatively, the ManyValue data structure, in some embodiments, is for variables that have been assigned more than one value (e.g., q:=1; p[x]). Lastly, the Error data structure is for variables that result in errors and should ideally be empty, while the Missing data structure includes a list of unhandled expressions.

When the runtime complexity tool determines at 225 that the variable does iterate (i.e., is assigned more than one possible value), the process transitions to 230 to bin the variable in the Many Values data structure. In some embodiments, in addition to binning the variable in the Many Values data structure, the runtime complexity tool determines the number of values assigned to the variable, and what the assigned values are (i.e., based on available input). This information, in some embodiments, is later used to calculate the complexity of the policy. After binning the variable, the process transitions to 240.

Otherwise, when the runtime complexity tool determines at 225 that the variable does not iterate, the process transitions to 235 to bin the variable in the One Value data structure. The process then transitions to 240 to determine whether there are additional variables in the policy to analyze. When the runtime complexity tool determines that there are additional variables in the policy to analyze, the process transitions back to 215 to select a variable from the identified variables.

When the runtime complexity tool determines (at 240) that there are no additional variables to analyze, the process transitions to 245 to use the binned variables to calculate time, size, and count complexities for the policy. Time complexity, for example, is representative of the maximum number of elements (i.e., worst case scenario) evaluated in the policy based on available input data, according to some embodiments. Size complexity in some embodiments is representative of a slice of data that an expression evaluates to. In some embodiments, count complexity is representative of the number of values in an array that are assigned to a variable.

After calculating the complexities, the runtime complexity tool provides (at 250) through the UI, a display showing the calculated complexities along with a set of suggestions for optimizing the policy. The process then ends. In some embodiments, a user may select to implement one or more suggestions provided though the UI. Also, in some embodiments, a user may select to implement changes to the policy other than the suggestions provided. Alternatively, in some embodiments, a user may decide not to implement any changes at all and instead opt to leave the policy as-is. The complexities and how they are calculated will be described in further detail below.

The following are details for calculating time, size, and count complexity for a term, expression, body and rule, according to some embodiments. In a first example, consider "x" as a virtual document with a rule "r" that does not have a body (i.e., a constant). Size and time complexity would be calculated using the following equations:

$$Size(x)=data.<path-to-x>;$$

$$Time(x)=1.$$

In a similar example, consider "x" is now a virtual document with rules "r1, . . . ,rn". Due to the addition of rules r2 through rn (i.e., compared to the first example), the size, time, and now count complexities would be calculated as follows:

$$Size(x)=Size(r1)+ \ldots +Size(rn);$$

$$Count(x)=Count(r1)+ \ldots +Count(rn);$$

$$Time(x)=Time(r1)+ \ldots +Time(rn).$$

That is to say, in the above example, that the size complexity for the virtual document is equal to the sum of the size complexities for each rule of the virtual document. Similarly, the count and time complexities are equal to their respective sums of the count and time complexities for each rule of the virtual document. Thus, if the complexity for each rule is a constant, the sum of the complexities will also be a constant.

In a third example, consider that "x" is a rule with a body. If the rule head is a complete rule(e.g., foo=V), then the complexities are calculated as follows:

$$Count(rule)=1;$$

$$Size(rule)=Size(rule,V);$$

$$Time(x)=Time(body).$$

If the rule head in the third example, however, is a partial set with variables "E1, . . . , En" (e.g., p[E]), then the complexities are calculated as follows:

$$Count(rule)=Count(rule,E1)* \ldots * Count(rule,En);$$

$$Size(rule)=(Size(rule,E1)+ \quad . \quad . \quad . \quad +Size(rule, En))*Count(rule);$$

$$Time(rule)=Time(body).$$

Next, if the rule head in the third example is a partial object(e.g., p[E]=V), then the complexities are calculated as follows:

$$Count(rule)=Count(rule,E);$$

$$Size(rule)=(Size(rule,E1)+Size(rule,V))*Count(rule);$$

$$Time(rule)=Time(body).$$

Lastly, if "x" in the third example is a function invocation "f(t1, . . . , tn)" with rules "r1, . . . ,rn", then the complexities are calculated as follows:

$$Count(x)=1;$$

$$Size(x)=SizeR1+ \ldots +SizeRn, \text{ where for rule } ri$$
$$\text{with head } f(x1, \ldots ,xn)=y, \text{ let } Bi=Ri.body\{x1/$$
$$t1, \ldots ,xn/tn\}, \text{ and } SizeRi=Size(Bi,y);$$

$$Time(x)=TimeR1+ \ldots +TimeRn, \text{ where}$$
$$TimeRi=Time(bi) \text{ and } f(1)f(x)=y\{y=2*x\}.$$

In a fourth example, to calculate "Time(body b)" where "b" is the array of expressions "e1, . . . ,en", suppose that "ei" has variables "v1, . . . ,vm" that occur for the first time, and suppose that only expressions with first occurrence variables are non-virtual references(e.g., data.servers[i], input.request.containers[x], etc.). By induction, Time([ ])=1. If "ei" has no first-occurrence variables, then:

Time([ei, . . . ,en])=Time(ei)+Time([ei+1, . . . ,en])

In this same fourth example, if "ei" is instead a strict data reference(i.e., no virtual documents) and has first occurrence variables, then:

Time(([ei, . . . ,en])=Count(v1)* . . . *Count(vm)*Time([ei+1, . . . ,en])

Finally, for the fourth example, if "ei" is a virtual document with first-occurrence variables, and "ei" references a set data "p[t]" with variables "v1, . . . ,vn" being first-occurrence, or if "ei" references a virtual object "p[t]" with variables "v1, . . . ,vn", then:

Time([ei, . . . ,en])=Time(p)+(Count(v1)* . . . * Count(vn))*Time([ei+1, . . . ,en])

In a fifth example, to calculate "Size(body b, expr e)", "Count(body b, expr e)", and "Time(expr e)", if "e" is scalar(i.e, number, string, etc.), then:

Count(body,e)=1;

Size(body,e)=1;

Time(e)=1.

In this same fifth example, if "e" is an assignment "x: =term2", then:

Count(body,x)=1;

Size(body,x)=Size(body,term2);

Time(e)=Time(term2).

If "e" is an extensional reference in the fifth example, suppose that "e" is of the form "root[a][b] . . . [c]" and variables "v1, . . . vn" appear for the first time in the body "b". If "e" is "data[ . . . ][v1]", or "input [ . . . ][v1]", which is an array reference and not a virtual document, then:

Count(body,vi)=prefix of e up to v1;

Size(body,vi)=O(1) since vi is an index into the array;

Count(body,e)=1;

Size(body,e)=e;

Time(e)=1.

If, again, "e" is an extensional reference in the fifth example, suppose that "e" is of the form "root[a][b] . . . [c]" and variables "v1, . . . vn" appear for the first time in the body "b". If "e" is "data[ . . . ][v1]" which is an object reference that is not a virtual document, then:

Count(body,vi)=prefix of e up to v1;

Size(body,vi)=O(1) since vi is a key in a JSON object;

Count(body,e)=1;

Size(body,e)=e;

Time(e)=1.

Lastly, if "e" again is an extensional reference in the fifth example, suppose that "e" is of the form "root[a][b] . . . [c]" and variables "v1, . . . vn" appear for the first time in the body "b". If "e" is "local[ . . . ][v1]", then the original data/input rooted reference should be assembled and the earlier logic should be applied.

Now, if "e" is a built-in "b(i1, . . . in, o)" for the fifth example(e.g., "Size(body b, expr e)", "Count(body b, expr e)", and "Time(expr e)"), Time(e)=1. If "b" is "walk(root, [path, out])" where "path, out" is a first occurrence, then:

Size(body,e)=1;

Size(body,path)=deepest path beneath root;

Size(body,out)=Size(root) and all subtrees under root are overapproximated by the size of root;

Count(out)=Count(path)=number of paths beneath root.

If there is no output, then Size(body, e)=1, which returns true or false. Otherwise, Count(body, e)=1, and Size(body, e) depends on the built-in and the size of the arguments. Suppose that there is metadata on each built-in that only identifies what the output-complexity is in terms of inputs, then implementation would be simple. While over-approximation is possible, the goal is to determine whether the inputs are linear or not.

Lastly, for the fifth example, if "e" is a virtual document reference(e.g., data . . . p . . . ), then Time(e)=Time(p). If "e" is "data . . . p[[t1, . . . tn]], where "p" is a virtual set with variables "v1, . . . ,vn" appearing for the first time, then:

Size(e)=Size(data . . . p);

Count(body,vi)=Count(data . . . p);

Size(body,vi)=SizeOfElement(data . . . p);

Time(body,e)=Time(body,p).

Similarly, if "e" is "data . . . p[x]=y", where "p" is a virtual document with variables "v1, v2" appearing for the first time, then:

Count(body,vi)=Count(data . . . p);

Size(body,vi)=SizeOfElement(data . . . p);

Size(e)=SizeofElement(data . . . p).

Lastly, if "e" is "data . . . p", where "p" is a virtual set or object, then:

Size(body,e)=Size(data . . . p).

In summary, to calculate time, size, and count complexity for a term(i.e., a Rego term), suppose that Time(x), Count (x), Size(x)=1 unless otherwise specified. Then:

Time(scalar)=1;

Time(composite)=1;

Time(var)=1;

Time(ground-ref-to-base)=1;

Time(non-ground-ref-to-base)=Size(ground-ref-to-base);

Time(ground-ref-to-virtual)=Time(Rules);

Time(non-ground-ref-to-virtual)=Time(Rules)+Size (ground-ref-to-virtual);

Time(comprehension)=Time(Body);

Time(func-call)=Time(Rules);

Sizeof(var)=Sizeof(Assignment);

Sizeof(ground-ref-to-base)=Sizeof(base);

Sizeof(ground-ref-to-virtual)=Sizeof(virtual-complete) OR Sizeof(virtual-partial);

Sizeof(virtual-complete)=Sizeof(AssignmentN);

Sizeof(virtual-partial)=Count(Head.KeyN)+Count(Head.KeyN+1)+ . . . ;

Sizeof(comprehension)=Count(Head.VarN)*Count(Head.VarN+1)* . . . ;

Count(Var)=Sizeof(ground-prefix) if(any of) non-ground ref operand($p[x]$) unified with non-ground ref(x=$p[y]$);

Count(Var)=SizeofExtent(value) if non-ground path output of walk(value);

Count(Var)=1 if none of the above;

Count(VarN+1)=Count(VarN) in ref($p[x][y]$, Count($x$)=Count($y$)).

For calculating complexity for an expression, Time (Expr)=Time(TermN)*Time(TermN+1). "Expr" is a relation when a reference contains a first occurrence of a variable and when "walk( )" and "path output" contain a first occurrence of the variable. Otherwise, "Expr" is a function.

For calculating complexity for a body(i.e., a rule body):

Time(Body)=Time(ExprN)+Time(ExprN+1) when ExprN is a function;

Time(Body)=Time(ExprN)*Time(ExprN+1)* . . . when ExprN is a relation.

Finally, for calculating complexity for a rule:

Time(Rule)=Time(Body) with variables in Head.Args and Head. Key as seen or unseen;

Count(Head.Args)=1;

Count(Head.Key)=Count(VarN)*Count(VarN+1)* . . . ;

Count(Head. Value)=1;

Time(Rules)=Time(RuleN)+Time(RuleN+1)+ . . .

FIGS. 3A-3B illustrate a first usage case of the runtime complexity tool described above. FIG. 3A illustrates a first code-based policy 310. After a user finishes authoring the code, the runtime complexity tool can be used to simply identify the runtime complexity of the policy in some embodiments. When invoked, the runtime complexity tool would analyze the policy 310 and determine that the policy has a linear runtime complexity, O(n). More specifically, as indicated by 315, the runtime complexity tool would indicate that the policy 310 has a runtime complexity of O(input.request.object.spec.containers).

FIG. 3B illustrates a second code-based policy 320. In this example, when the user invokes the runtime complexity tool, the tool would analyze the policy and determine that the policy 320 has a non-linear runtime complexity, O($n^2$) (i.e., quadratic). Specifically, as indicated by 325, the runtime complexity tool would identify the runtime complexity of the policy 320 as O(input.request.object.spec.containers) *O(foo). That is to say, the runtime of this policy is dependent on the input spec containers as well as on the runtime of the function foo(x).

While the first use case of the runtime complexity tool shown in FIGS. 3A-3B analyzes policies to return the runtime complexity, some embodiments of the runtime complexity tool include a second usage in which the tool also provides suggestions regarding how the policy can be optimized to improve the runtime. In some embodiments, in addition to providing suggestions for optimizing the policy, the runtime complexity tool provides an optimized version of the policy. For example, in some embodiments, the runtime complexity tool is implemented as an online interactive tool (referred to herein as the Rego Playground) through which users can determine the runtime complexity of policies that they author, receive suggestions on how to optimize the policies, receive optimized versions of the policies based on the suggested remedies, and even share these policies.

Figure 4:
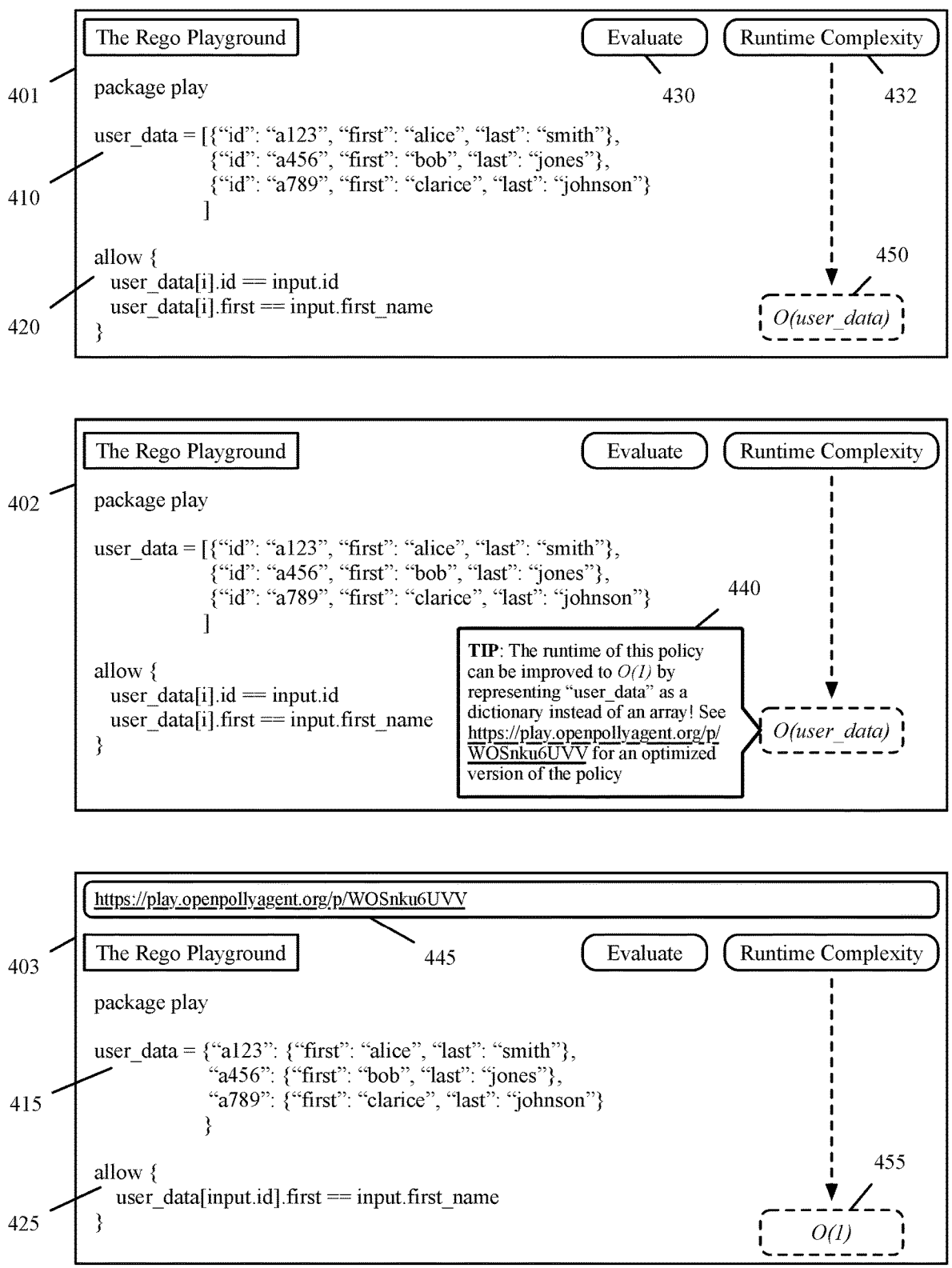
FIG. 4 an example UI interaction with the Rego Playground over three stages, according to some embodiments.

FIG. 4 illustrates an example UI interaction with the Rego Playground over three stages, according to some embodiments. As shown in the first stage 401, a user has authored a policy 420 with input 410. The input 410 is written as an array, meaning the policy must iterate through each element in "user_data" in order to find the "id" provided in the input. The Rego Playground interface, as shown includes a set of tools 430-432 for evaluating the policy and determining the runtime complexity of the policy. In the first stage 401, a user has already selected the tool 432 to determine the runtime complexity of this policy. For this policy 420, the runtime complexity tool has identified a runtime complexity 450 of O(user_data), indicating that the policy's runtime complexity is linear (i.e., O(n)).

After determining that the policy has a linear runtime complexity, the runtime complexity tool in some embodiments determines what slice of data (e.g., what slice of JSON data) the policy is iterating over. As mentioned above, the policy in this particular example has to iterate over each element in "user_data". Based on this determination, the runtime complexity tool provides suggestions for optimizing the policy. For example, in stage 402, the UI now includes a tip 440 indicating that the runtime of the policy 420 can be improved to O(1) (i.e., constant) by representing "user_data" as a dictionary instead of an array, which would eliminate the need for the policy to iterate through each "user_data" element. While not shown, the runtime complexity tool in some embodiments may also identify issues based on whether certain metrics meet or surpass a specified threshold.

In addition to providing a suggestion for optimizing the policy, the tip 440 also includes a link to an optimized version of the policy. As mentioned above, the decision to optimize a policy belongs to the user, according to some embodiments, and there is no requirement to implement the suggested optimizations, or any optimizations. Also, in some embodiments, the runtime complexity tool may provide suggestions other than, or in addition to, the suggestion provided in this example.

Stage 403 illustrates the UI after the user has selected the link provided in tip 440. As shown, the link 445 appears at the top of the display, with the optimized versions of the policy 425 and input 415 appearing below. The optimized input 415 is now represented as a dictionary, thus eliminating the need for the policy to iterate through "user_data" to find the "id", and the policy has been optimized to reflect the same. As a result, the runtime complexity tool has calculated a new runtime complexity 455 of O(1) for the optimized policy 425, indicating that the policy's runtime complexity is now constant, which is an improvement over the original linear runtime complexity.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
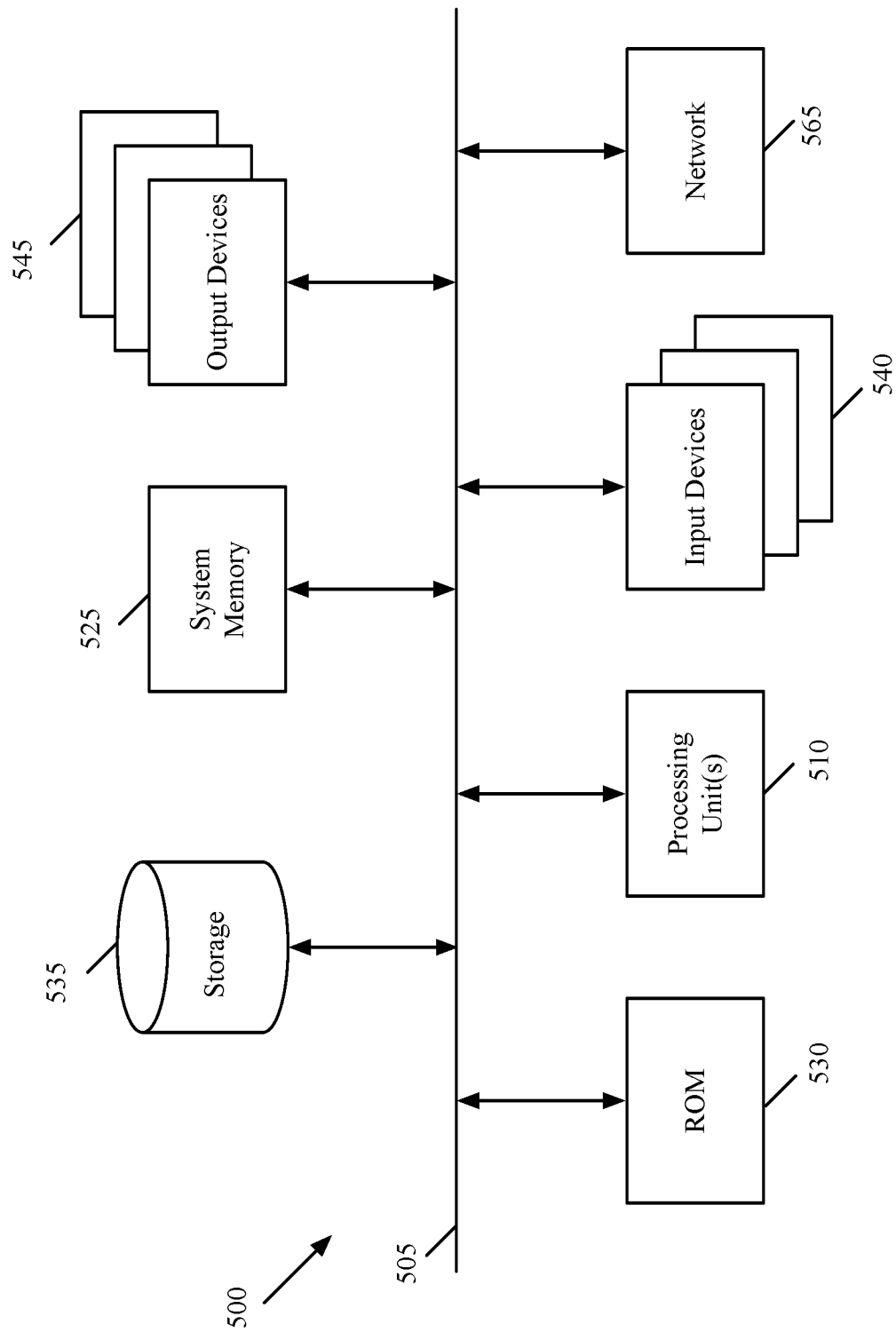
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer (e.g., a desktop computer, personal computer, tablet computer, server computer, mainframe, a blade computer etc.), phone, PDA, or any other sort of electronic device. The electronic system 500 is also the control plane modules of the load balancer of some embodiments. As shown, the electronic system includes various types of computer readable media and interfaces for various other types of computer readable media. Specifically, the electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory (ROM) 530, the system memory 525, and the permanent storage device 535. From these various memory units, the processing unit(s) 510 retrieve instructions to execute and data to process in order to execute the processes of the invention. The processing unit(s) may be a single processor or a multi-core processor in different embodiments.

The ROM 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes (e.g., FIG. 2). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

The invention claimed is:

1. A method for modifying code used to define a policy based on runtime complexity of the code defining the policy, the method comprising:
receiving, through a user interface (UI), a first set of code that a user authors to define a particular policy comprising a plurality of rules, each rule comprising a set of variables;
for each rule in the particular policy, analyzing a number of occurrences of each variable in the set of variables of the rule;
based at least in part on the analysis of the number of occurrences of each variable in the set of variables for each rule in the particular policy, calculating a set of complexity metrics for the particular policy that express complexity of the particular policy;
based on the calculated set of complexity metrics, identifying a set of one or more suggestions for defining the particular policy in a more optimized way than the first set of code;
displaying, through the UI, (i) the identified set of one or more suggestions and (ii) a selectable control for selecting one or more of the set of suggestions;
receiving a selection of at least one identified suggestion; and
after receiving the selection, replacing the first set of code with a second set of code that defines the particular policy in a more optimized way than the first set of code.

2. The method of claim 1, wherein calculating the set of complexity metrics comprises calculating, for each rule in the particular policy, at least two of time complexity, size complexity, and count complexity.

3. The method of claim 1, wherein for a particular rule, analyzing the number of occurrences of each variable of the particular rule comprises identifying, for each variable, a first occurrence of the variable in the particular rule to determine a number of values assigned to the variable, wherein variables determined to be assigned one value are separated from variables determined to be assigned more than one value.

4. The method of claim 3, wherein variables that are determined to be assigned one value are further determined to be noniterative and variables that are determined to be assigned more than one value are further determined to be iterative.

5. The method of claim 4, wherein analyzing the number of occurrences of each variable of the particular rule further comprises, for each iterative variable, identifying (i) a number of iterations for the variable and (ii) a set of values assigned to the variable.

6. The method of claim 3, wherein analyzing the number of occurrences of each variable in the particular rule further comprises binning variables that are assigned only one value in a first data structure and binning variables that are assigned more than one value in a second data structure.

7. The method of claim 1, wherein:
at least one variable appears in at least two expressions of the particular policy; and
only a first occurrence of the at least one variable is processed during the analysis of the number of occurrences of each variable in the set of variables of the rule.

8. The method of claim 1, wherein:
identifying the set of suggestions comprises generating one or more different sets of code that represent one or more optimized versions of the first set of code that defines the particular policy, wherein the different sets of code comprise the second set of code; and
displaying the set of suggestions comprises displaying, through the UI, description of the one or more suggestions for defining the particular policy.

9. The method of claim 1 further comprising displaying, through the UI, the selectable control for selecting the second set of code that defines the particular policy.

10. A non-transitory machine readable medium storing a program that when executed by a set of processing units identifies runtime complexity of a policy, the program comprising sets of instructions for:
receiving, through a user interface (UI), a first set of code that a user authors to define a particular policy comprising a plurality of rules, each rule comprising a set of variables; and
for each rule in the particular policy, analyzing a number of occurrences of each variable in the set of variables of the rule;
based at least in part on the analysis of the number of occurrences of each variable in the set of variables for each rule in the particular policy, calculating a set of complexity metrics for the particular policy that express complexity of the particular policy; and
based on the calculated set of complexity metrics, identifying a set of one or more suggestions for defining the particular policy in a more optimized way than the first set of code;
displaying, through the UI, the identified set of one or more suggestions for defining the particular policy in a more optimized way than the first set of code; and
after receiving a selection of one of the identified suggestions, replacing the first set of code with a second set of code that defines the particular policy in a more optimized way than the first set of code.

11. The non-transitory machine readable medium of claim 10, wherein the set of instructions for analyzing the number of occurrences of each variable in the set of variables for a particular rule comprises a set of instructions for identifying, for each variable, a first occurrence of the variable in the particular rule to determine a number of values assigned to the variable, wherein variables determined to be assigned one value are separated from variables determined to be assigned more than one value.

12. The non-transitory machine readable medium of claim 11, wherein:
variables that are determined to be assigned one value are further determined to be noniterative and variables that are determined to be assigned more than one value are further determined to be iterative;
and the set of instructions for analyzing the number of occurrences of each variable of the particular rule further comprises a set of instructions for identifying, for each iterative variable, (i) a number of iterations for the variable and (ii) a set of values assigned to the variable.

13. The non-transitory machine readable medium of claim 12, wherein the set of instructions for analyzing the number of occurrences of each variable in the particular rule further comprises a set of instructions for binning variables that are assigned only one value in a first data structure and binning variables that are assigned more than one value in a second data structure.

14. The non-transitory machine readable medium of claim 10, wherein:
at least one variable appears in at least two expressions of the particular policy; and
only a first occurrence of the at least one variable is processed during the analysis of the number of occurrences of each variable in the set of variables of the rule.

15. The non-transitory machine readable medium of claim 10, wherein:
the set of instructions for identifying the set of suggestsions comprises a set of instructions for generating one or more different sets of code that represent one or more optimized versions of the first set of code that defines the particular policy, wherein the different sets of code comprise the second set of code; and
the set of instructions for displaying comprises a set of instructions for displaying, through the UI, description of the one or more suggestions for defining the particular policy.

16. The method of claim 1, wherein the set of complexity metrics comprises a runtime complexity metric that expresses a complexity of executing the particular policy at runtime.

17. The non-transitory machine readable medium of claim 10, wherein the set of complexity metrics comprises a runtime complexity metric that expresses a complexity of executing the particular policy at runtime.

18. The method of claim 1, wherein calculating the set of complexity metrics for the particular policy comprises, for a particular complexity metric:
for each rule in the particular policy, calculating the particular complexity metric based at least in part on the number of occurrences of each variable in the set of variables for the rule; and
computing the particular complexity metric for the particular policy as a summation of the particular complexity metric calculations for each rule in the particular policy.

19. The method of claim 1, wherein:
the set of complexity metrics comprises at least two different complexity metrics; and
each of the complexity metrics calculated for the particular policy is a summation of corresponding complexity metrics calculated for each rule of the particular policy.

20. The method of claim 19, wherein:
calculating a first complexity metric for a particular rule comprises using a calculated second complexity metric for the particular rule; and
the second complexity metric and a third complexity metric for the particular rule are calculated independently of the other complexity metrics.

21. The method of claim 19, wherein, for a particular rule, a first complexity metric is a constant value and a second complexity metric is a function of a value assigned to at least one variable of the rule.

22. The method of claim 1, wherein the method is performed by an interactive online tool, the method further comprising sharing the particular policy defined by the second set of code.

23. The method of claim 1, wherein:
a particular complexity metric indicates that the first set of code has a complexity that is linear based on an amount of data in an array evaluated by the policy; and
at least one identified suggestion for defining the particular policy improves the set of code to have a complexity that is constant irrespective of the amount of data.

* * * * *